(12) United States Patent
Prothero

(10) Patent No.: US 10,931,403 B2
(45) Date of Patent: Feb. 23, 2021

(54) COMMUNICATION DEVICES, SYSTEMS, SOFTWARE AND METHODS EMPLOYING SYMBOL WAVEFORM HOPPING

(71) Applicant: Astrapi Corporation, Dallas, TX (US)

(72) Inventor: Jerrold Prothero, Delray Beach, FL (US)

(73) Assignee: Astrapi Corporation, Dallas, TX (US)

( * ) Notice: Subject to any disclaimer, the term of this patent is extended or adjusted under 35 U.S.C. 154(b) by 0 days.

(21) Appl. No.: 16/819,125

(22) Filed: Mar. 15, 2020

(65) Prior Publication Data

US 2020/0366414 A1    Nov. 19, 2020

Related U.S. Application Data

(60) Provisional application No. 62/848,279, filed on May 15, 2019.

(51) Int. Cl.
| | |
|---|---|
| *H04L 27/26* | (2006.01) |
| *H04L 1/00* | (2006.01) |
| *H04L 27/34* | (2006.01) |

(52) U.S. Cl.
CPC .......... *H04L 1/0071* (2013.01); *H04L 1/0003* (2013.01); *H04L 1/0041* (2013.01); *H04L 27/2602* (2013.01); *H04L 27/2647* (2013.01); *H04L 27/34* (2013.01)

(58) Field of Classification Search
CPC .... H04L 27/0004; H04L 27/2642; H04L 9/00
See application file for complete search history.

(56) References Cited

U.S. PATENT DOCUMENTS

| | | |
|---|---|---|
| 3,204,034 A | 8/1965 | Ballard |
| 3,384,715 A | 5/1968 | Higuchi |
| 5,034,911 A | 7/1991 | Rachels |
| (Continued) | | |

FOREIGN PATENT DOCUMENTS

| | | |
|---|---|---|
| WO | 2011084280 | 7/2011 |
| WO | 2012066383 | 5/2012 |
| WO | 2018085771 | 5/2018 |

OTHER PUBLICATIONS

I. Kvecher, et al. An Analog Modulation Using a Spiral Mapping•t 2006 IEEE 24th Convention of Electrical and electronics Engineers in Israel, pp. 194-198 (5 pgs.).

(Continued)

*Primary Examiner* — Kevin Kim
(74) *Attorney, Agent, or Firm* — Law Office of Michael Antone; Michael Antone (57) ABSTRACT

Systems, devices, and methods of the present invention facilitate secure communication by altering the set of symbol waveforms that may be in use in particular symbol times defined herein as Symbol Waveform Hopping. SWH may be enabled by selecting two or more modulation formats that have sufficiently comparable communication performance (e.g., occupied bandwidth and signal power efficiency), but characterized by symbol waveform alphabet that include different symbol waveform, so that the overall transmission/communication performance of the system is not significantly affected by switching between modulation formats. Some or all of the symbol waveforms in each alphabet may not be present in other alphabets.

22 Claims, 8 Drawing Sheets

(56) References Cited

U.S. PATENT DOCUMENTS

| | | |
|---|---|---|
| 7,146,324 B2 | 12/2006 | Brinker et al. |
| 2002/0122505 A1 | 9/2002 | Avidor et al. |
| 2003/0026357 A1 | 2/2003 | Bartlett |
| 2004/0174737 A1 | 9/2004 | Graffouliere |
| 2004/0230387 A1 | 11/2004 | Bechhoefer |
| 2005/0071742 A1 | 3/2005 | Balinsky |
| 2008/0130714 A1 | 6/2008 | Wilborn |
| 2012/0263031 A1 | 10/2012 | Prothero |
| 2013/0305120 A1 | 11/2013 | Osamu et al. |
| 2014/0198869 A1 | 7/2014 | Melzer et al. |
| 2015/0156049 A1 | 6/2015 | Prothero |
| 2015/0163670 A1 | 6/2015 | Karabinis |
| 2016/0212005 A9 | 7/2016 | Jones et al. |
| 2020/0145044 A1* | 5/2020 | Kellum ................. H04L 5/0007 |
| 2020/0382355 A1* | 12/2020 | Schultze ............ H04L 27/2627 |

OTHER PUBLICATIONS

Dr. Jerrold Prothero, "The Shannon Law for Non-Periodic Channels", Technical Report ASTRAPI Exponential ommunication, Mar. 2, 2012, 30 pgs—(XP055360929).

Konrad Piwnicki, "Modulation Methods Related to Sine-Wave Crossings", IEEE Transactions on Communications, COM-31, No. 4, Apr. 1983, pp. 503-508 (6 pgs.).

Jerrold Prothero, Ph.D., "Euler's Formula for Fractional Powers of i", Chapters 1-8, Apr. 15, 2017, 72 pgs.

* cited by examiner

COMMUNICATION DEVICES, SYSTEMS, SOFTWARE AND METHODS EMPLOYING SYMBOL WAVEFORM HOPPING

CROSS-REFERENCE TO RELATED APPLICATIONS

This application claims the benefit of and priority from U.S. Provisional Patent Application No. 62/848,279, filed on May 15, 2019, entitled "Communication Devices, Systems, Software and Methods employing Symbol Waveform Hopping", the entire contents of which is hereby incorporated by reference.

STATEMENT REGARDING FEDERALLY SPONSORED RESEARCH OR DEVELOPMENT

This invention was made with government support under Award #1738453 awarded by the National Science Foundation. The government has certain rights in the invention.

BACKGROUND OF THE INVENTION

Field of the Invention

The present invention relates in general to data transmission, and more particularly relates to transmitting data using multiple modulation formats to make the data more difficult for unintended recipients to receive.

Background Art

For many purposes, there is a need to secure communications from interception, or in some cases even from detection. This problem is described as "low probability of intercept/low probability of detection" (LPI/LPD).

A first level of security is generally associated with encrypting the data, transmitting and receiving the encrypted data, and decrypting the data. Another level of security may be to vary the transmission channel over which the data is sent. For example, frequency-hopping spread spectrum (FHSS) may be employed. FHSS sends data using multiple carrier frequencies and switches between the multiple carrier frequencies using a pseudorandom sequence known to the transmitter and receiver. FHSS is also the basis for Code-Division Multiple Access (CDMA).

With the continuing increase in signal processing capabilities available to adversaries, it is a continuing challenge to securely encrypt and transmit with LPI/LPD. As such, there is a continuing need for system, devices, software, and methods that may be used to make it more difficult for adversaries to intercept and access the data being transmitted through communication systems.

BRIEF SUMMARY OF THE INVENTION

Systems, devices, software, and methods of the present invention enable the enhancement of LPI/LPD communication by switching between symbol waveforms used to transmit data. Varying symbol waveforms during transmission presents a potential adversary with the problem of not knowing the format of a transmitted signal, as the symbol waveforms to be recognized may change randomly and as often as every symbol time.

Unlike the prior art modulation formats, which are predominantly based on constant amplitude sinusoids over each symbol time, the present invention enables the use of more general symbol waveforms, such as polynomial symbol waveforms (PSWs), that allow for the creation of very different modulation formats with comparable transmission/communication performance, thereby enabling symbol waveform variation during transmission without a loss of performance. The variation of symbol waveforms used in the transmission of a bit stream is referred to herein as "Symbol Waveform Hopping" (SWH). SWH may employ multiple symbol waveform alphabets, each alphabet including multiple symbol waveforms that may be different between the alphabets and switch between the different symbol waveform alphabets during transmission times according to a sequence, e.g., pseudo-randomly, which is predetermined and known to the transmitter and receiver.

SWH may be enabled by selecting two or more modulation formats that have sufficiently comparable transmission/communication performance (e.g., occupied bandwidth and signal power efficiency) so that the overall communication performance of the system is not significantly affected by switching between modulation formats as indicated by SWH. Also, these two or more modulation formats should be sufficiently distinct that a receiver configured to detect one of these modulation formats will be poorly suited to or unable to recognize the others. Similarly, the first and second formats should be selected so that signals in each format cannot be received and the original bit stream sufficiently reconstituted by a third format. The modulation formats are characterized by symbol waveform alphabets including a set of different symbol waveforms that characterize the modulation format. Some or all of the symbol waveform in each alphabet may not be present in other alphabets.

In various embodiments, a user and/or an automated process may provide to a transmitter and a receiver in a communication system used to transmit data a predetermined symbol waveform alphabet sequence and a plurality of symbol waveform alphabets to be used to transmit data via symbol waveforms from the transmitter to the receiver. At least two of the symbol waveform alphabets may include one or more different symbol waveforms as noted above. For any given application of the system, the alphabets may be chosen such that data sent via the symbol waveforms in each alphabet can not be meaningfully detected or received using one of the other alphabets and that each alphabet has a sufficiently similar transmission/communication performance for the specific application and not, necessarily in general.

Data being transmitted through the system is converted into a sequence of symbol waveforms that are selected from the plurality of symbol waveform alphabets based on the predetermined symbol waveform alphabet sequence, and then transmitted. The sequence of symbol waveforms may be received by the receiver and converted back into the data based on the predetermined symbol waveform alphabet sequence. In various embodiments, a time-amplitude sequence corresponding to the data may be transmitted by sampling the sequence of symbol waveforms.

The plurality of symbol waveform alphabets used in the methods, systems, and apparatuses may be selected to have similar transmission/communication performance, such as similar OBW and bit error rate (BER) versus additive white Gaussian noise (AWGN) performance. In various embodiments, the plurality of symbol waveform alphabets may be selected to have a number of symbol waveforms equal to a power of two and/or the same number of symbol waveforms. Also, the symbol waveforms may be sized to correspond to one symbol time or other data measure.

In various embodiments, the symbol waveform alphabets may be implemented as one or more lookup tables stored in computer readable medium, memory, or other storage that may be accessed, retrieved, and be otherwise made available for use by the system. The symbol waveform alphabets may be generated as a set of polynomial symbol waveforms and/or as symbol waveforms representative of traditional modulation formats.

In various embodiments, a set of symbol waveform alphabets to transmit data are identified, in which each alphabet includes at least one symbol waveform and has similar overall signal transmission characteristics, but different sets of symbol waveforms from other alphabets. Unique identifiers are assigned to each symbol waveform alphabet and a unique bit string is associated with each symbol waveform in each alphabet.

In preparation for transmission, data is converted into a sequence of bit strings and may be further converted to bit string subsequences. The transmitter and/or other processor upstream from the transmitter may access the symbol waveform alphabet according to the predetermined symbol waveform alphabet sequence and select the symbol waveforms within the accessed symbol waveform alphabet corresponding to the bit string subsequences and provide the sequence of symbol waveforms for transmission.

The predetermined symbol waveform alphabet sequence may be provided by the transmitter to the receiver or by the receiver to the transmitter. Alternatively, or in addition, a management system may provide the predetermined symbol waveform alphabet sequence to one or both the transmitter and receiver. It will be appreciated that varying the source of the predetermined symbol waveform alphabet sequence may make interception more difficult.

In various embodiments, the predetermined symbol waveform alphabet sequence may not be transmitted, but may be generated at the transmitter and/or receiver based on an initiator code provide by the transmitter, receiver, or management system that results in the sequence being generated by a sequence generator in the transmitter and receiver. The local generation of the predetermined symbol waveform alphabet sequence may increase the security of data passing through the system.

The present invention may be employed alone or in parallel with other encryption techniques known to the art, including FHSS and bit stream/data encryption. In addition, the present invention may be used with single and/or parallel, i.e., multi-channel, transmission techniques.

As may be disclosed, taught, and/or suggested herein to the skilled artisan, the present invention addresses the continuing need for hardware and/or software systems, devices, and methods that secure communications and provide LPI/LPD enhancements.

BRIEF DESCRIPTION OF THE DRAWINGS

Advantages of embodiments of the present invention will be apparent from the following detailed description of the exemplary embodiments thereof, which description should be considered in conjunction with the accompanying drawings, which are included for the purpose of exemplary illustration of various aspects of the present invention to aid in description, and not for purposes of limiting the invention.

In the drawings and detailed description, the same or similar reference numbers may identify the same or similar elements. It will be appreciated that the implementations, features, etc., described with respect to embodiments in specific figures may be implemented with respect to other embodiments in other figures, unless expressly stated, or otherwise not possible.

DETAILED DESCRIPTION OF THE INVENTION

Aspects of the invention are disclosed in the specification and related drawings, which may be directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, a discussion of several terms used herein may be included.

The word "exemplary" is used herein to mean "serving as an example, instance, or illustration" and not as a limitation. Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by field programmable gate arrays, by program instructions being executed by one or more processors, or by a combination thereof. Additionally, sequence(s) of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action. For example, it will be appreciated that transmitters, receivers, management systems, and other devices in systems of the present invention may include one or more processors, memory, storage, input and components, communication interfaces, as well as other components that may be interconnected as desired by the skilled artisan via one or more buses and circuit boards, cards, etc.

Systems, devices, software, and methods of the present invention enable the enhancement of LPI/LPD communication by switching between symbol waveforms used to transmit data. Varying symbol waveforms during transmission presents a potential adversary with the problem of not knowing the format of a transmitted signal, as the symbol waveforms to be recognized may change randomly and as often as every symbol time.

Unlike the prior art modulation formats, which are based on constant amplitude sinusoids with stationary spectrums that provide very different communication performance if the waveform design is significantly altered e.g. by altering phase separation, the present invention enables the use of symbol waveforms, such as polynomial symbol waveforms (PSWs), that allow for the creation of different modulation formats with comparable communication performance, thereby enabling symbol waveform variation during transmission without a loss of performance. Modulation formats may be represented as symbol waveform alphabets that include one or more symbol waveforms. The symbol waveforms may be based on constant amplitude sinusoids with stationary spectrums as well as varying amplitude waveforms with non-stationary spectrums to form alphabets including different symbol waveforms, but provide similar transmission/communication performance or sufficient performance such that data may be transmitted via the alphabet and received by a receiver in a specific application.

The variation of symbol waveforms and specifically waveform alphabets during the transmission of a bit stream is referred to herein as "Symbol Waveform Hopping" (SWH). SWH employs multiple symbol waveform alphabets and switches between the different symbol waveform alphabets during transmission times according to a predetermined symbol waveform alphabet sequence, e.g., pseudo-randomly, known to the transmitter and receiver. For example, if two alphabets A and B are used, the predetermined sequence may be 3A2B1A3B . . . as selected by a user or generated randomly or otherwise. In addition, the alphabet sequence may be varied at random or periodic intervals as may be desired. Predetermined merely means that the sequence is known to the transmitter before transmission and to the receiver before reception sufficiently to enable transmission of the data using the sequence. In various embodiments, the sequence may only be known to the transmitter and receiver transmitting the data and not to the management system or other devices or users, or to some portion of those entities.

SWH may be enabled by selecting two or more modulation formats that have sufficiently comparable communication performance for an application (e.g., occupied bandwidth and signal power efficiency) so that the overall communication performance of the system is not significantly affected by switching between modulation formats as indicated by SWH. In addition, the two or more modulation formats used for SWH should be sufficiently distinct that a receiver configured to detect one of these modulation formats will be poorly suited to or unable to recognize signals in the other formats. Similarly, the first and second formats should be selected so that signals in each format cannot be received and the original bit stream sufficiently reconstituted by a third format.

Some or all of the symbol waveforms in each alphabet may not be present in other alphabets. The skilled artisan will appreciate that the differentiation between the symbol waveforms in each alphabet may depend upon various factors, such as the network, application, etc. For example, it may be desirable to include some alphabets with some or many similar waveforms for some applications and no similar waveforms in other applications.

For any given application of the system 10, the alphabets may be chosen such that data sent via the symbol waveforms in each alphabet can not be meaningfully detected or received using one of the other alphabets and that each alphabet has a sufficiently similar transmission/communication performance for the specific application and not, necessarily in general. For example, if alphabet A and B can be reliably transmitted 1000 km and 2000 km, respectively, then the performance of these alphabets may be similar and data can be reliably transmitted and received using both alphabets for transmission distance less than 1000 km and not for distance greater than 1000 km. It will be appreciated that it may be possible to detect signals sent with the various alphabets and convert the signal into bits, but the selection of the alphabets is such that the data can not be received, i.e., recovered from the signal and bits in useful manner, using the other alphabets.

The difference between the symbol waveforms in each alphabet can range from one to all, as the variations in the symbol waveforms merely needs to be sufficient that data sent via each alphabet can not be determined by detecting the other alphabets. In various embodiments, it may be possible to have two or more alphabets, e.g. A and B, of a larger set of alphabets, A-C, where data sent via A or B could be determined by A or B, so long as alphabet C could not determine the data sent using A or B and data sent using C could not be determined using A or B.

Spiral and polynomial based modulation techniques may be useful for generating symbol waveforms in the present invention. These techniques may be used to produce formats with non-stationary spectra, which provides additional freedom in generating symbol waveforms that provide comparable communication performance. For additional information on spiral and polynomial waveform design and modulation, see, for example, U.S. Pat. No. 8,472,534 entitled "Telecommunication Signaling Using Non-Linear Functions", U.S. Pat. No. 8,861,327 entitled "Methods and Systems for Communicating", U.S. Pat. No. 10,069,664 entitled "Spiral Polynomial Division Multiplexing" (SPDM), and U.S. patent application Ser. No. 16/735,655 filed Mar. 6, 2020 entitled "Devices, Systems, And Methods Employing Polynomial Symbol Waveforms", the contents of which are herein incorporated by reference in their entirety, except for the claims and any disclosure contrary to this disclosure, and Prothero, J., Islam, K. Z., Rodrigues, H., Mendes, L., Gutiérrez, J., & Montalban, J. (2019), Instantaneous Spectral Analysis. *Journal of Communication and Information Systems,* 34(1), 12-26, https://doi.org/10.14209/jcis.2019.2.

Figure 1:
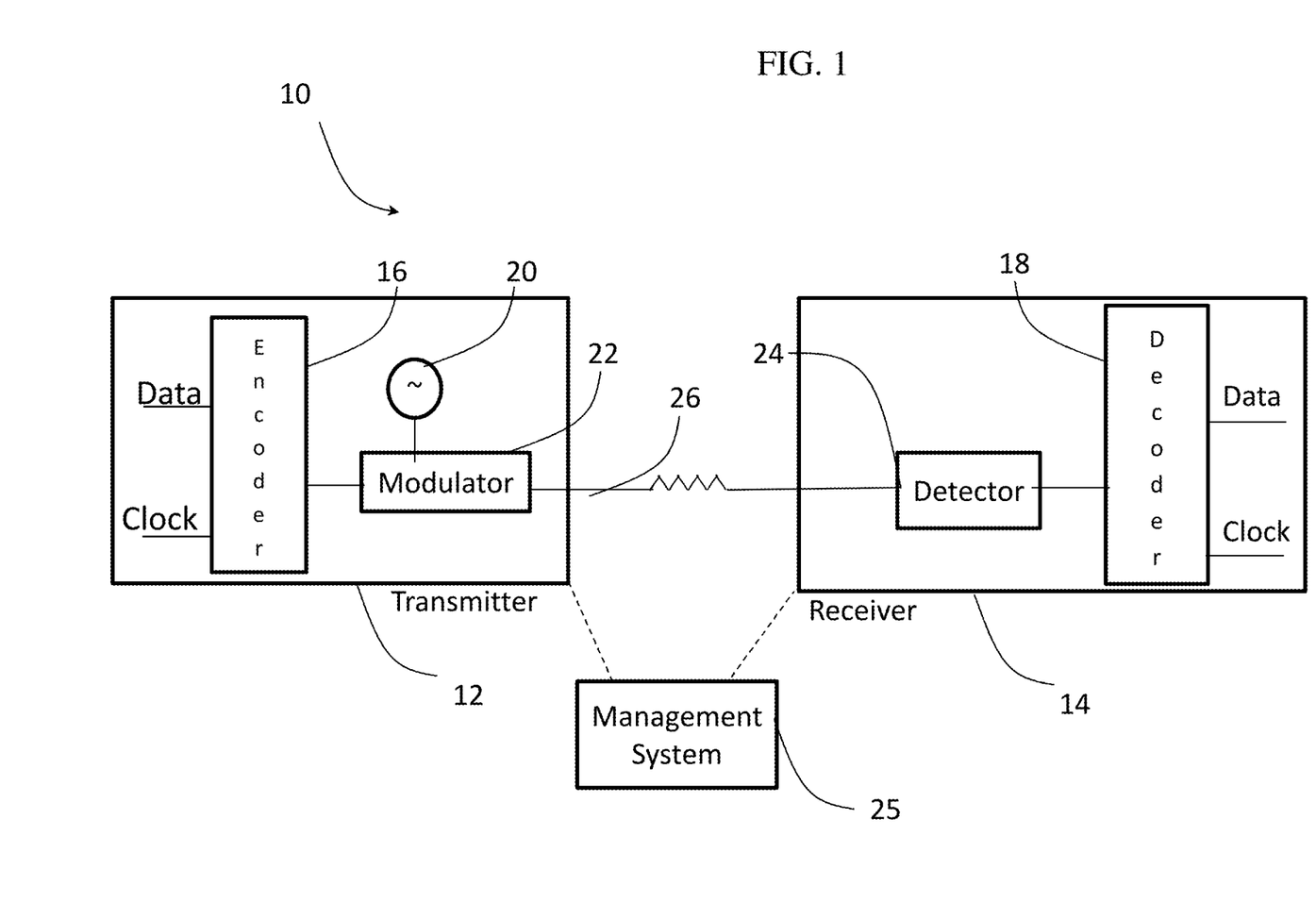
FIG. 1 illustrates exemplary data transmission systems.
Figure 2:
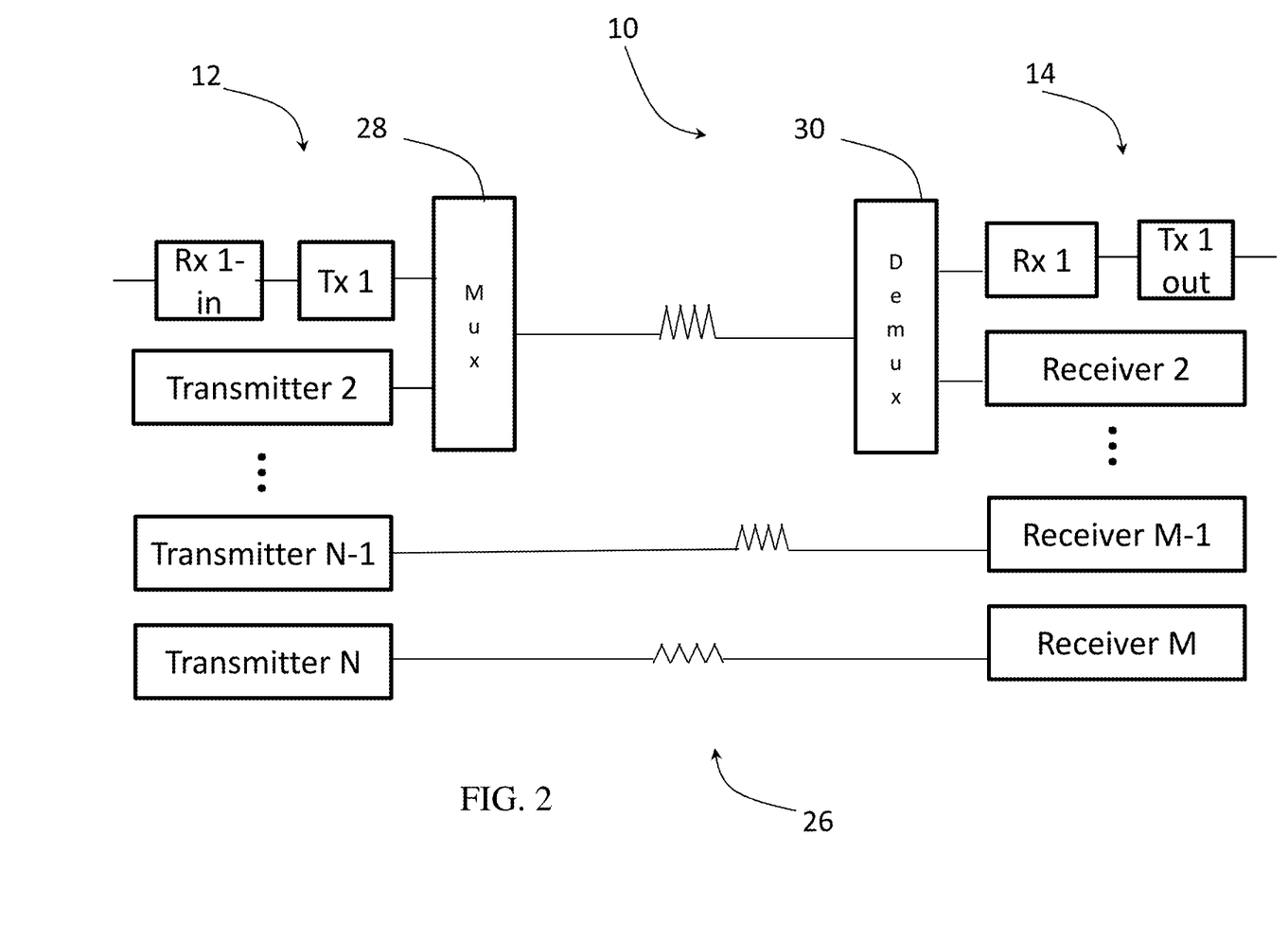
FIG. 2 illustrates exemplary data transmission systems.

FIG. 1 shows exemplary systems 10 including exemplary transmitter 12 and receiver 14 pairs that may be used in transmission or communication systems, such as further shown in FIG. 2. Bits, usually representing data/information, being transmitted through the system 10 may be converted to symbol waveforms in a channel encoder 16 section of the transmitter 12, as well as have other signal processing, e.g., forward error correction, performed to prepare the transmission signal.

The symbol waveforms may then be used to modulate a carrier provided by a carrier source 20 using an external modulator 22 as shown in FIG. 1 or to directly modulate the carrier source 20 to produce the transmission signal. The symbol waveforms may be transmitted using multiple carriers simultaneously, such as when implemented with Instantaneous Spectral Analysis ("ISA"), see U.S. Pat. No. 10,069,664 incorporated above.

The encoder 16 and decoder 18 are shown as single blocks in FIG. 1. However, the encoder 16 and decoder 18 may include one or more stages/components that are used to process the information passing through the system 10. The encoding and decoding function may be performed inside and/or outside the transmitter 12 and receiver 14, as desired by the skilled artisan.

At the receiver 14, a detector 24 may detect the transmission signal and provide the transmission signal to signal processors, which may include the decoder 18 to perform any decoding necessary to output the bits. The bits output from the system 10 may be in the form of data and clock signals, or otherwise. In various embodiments, the system 10 may be locally and/or remotely monitored and/or controlled by a management system 25 as is known in the art. The system 10 may be deployed as part of a local private point-to-point network, as well as part of the global terrestrial and satellite infrastructure and managed accordingly.

FIG. 2 shows exemplary systems 10 that include a plurality of transmitters 12 and receivers 14 that may be deployed in various transmission and communication systems employing various wired and wireless transmission media 26 and may include symbol waveform hopping technology of the present invention. For example, systems 10, such as shown in FIG. 1 and FIG. 2 and other systems, may be deployed in various electrical and optical wired transmission and communication networks, as well as satellite and terrestrial wireless networks. In various systems, the transmission signals may be multiplexed in a multiplexer 28 before transmission and may require demultiplexing before detection in a demultiplexer 30 after transmission, as is commonly performed in wired and wireless systems carrying multiple channels.

The symbol waveform alphabets that may be used in the system 10 may be maintained proximate or in the various transmitters 12, receivers 14, and management system 25, as well as in other locations that may be accessed by user and the management system 25, via an automated process or otherwise, and provided to the transmitters 12 and receivers 14. It will be appreciated that the user may be the owner of the data being transmitted, a system administrator or operator, a trusted third party, etc. as decided by the parties involved.

In various embodiments, the symbol alphabets that are to be used in the system 10 may be maintained in a computer readable storage medium/memory/storage in the transmitters 12 and receivers 14, such as stored in one or more look-up tables or other formats that may be accessed by processors running on the devices. The alphabets and the alphabet sequence may be locally and/remotely installed or provided to the equipment at various points in time ranging from the initial deployment of the equipment to just prior to use in transmission.

In various embodiments, the SWH technology of the present invention described herein may be implemented as follows:

1. Identify a set of symbol waveform alphabets to be used to transmit bits in the hardware and/or software system. The alphabets may be designed using techniques disclosed in U.S. patent application Ser. No. 16/735,655, incorporated above, or other techniques. The set of symbol waveform alphabets may be designed to have similar OBW, signal power efficiency, and/or other characteristics, so that the overall signal transmission characteristics are not sufficiently altered by switching between symbol waveform alphabets to prevent efficient transmission of the underlying data. Simulation software and/or hardware transmission tests may be used to compare the performance characteristics of various symbol waveform alphabets. Modulation formats that have similar OBW and bit error rate (BER) versus additive white Gaussian noise (AWGN) performance may be suitable candidates for various SWH applications. The skilled artisan may vary the criteria used for selecting modulation formats depending upon the specific application. For example, in various embodiments, the number of symbol waveforms in each alphabet may be selected to be a power of two or not. Similarly, the symbol waveform alphabets may or may not include the same number of symbol waveforms.
2. Assign a unique identifier to each symbol waveform alphabet.
3. Associate a unique bit string to each symbol waveform in each alphabet.
4. Prior to communicating a message, i.e., information/data, establish a symbol waveform alphabet sequence that is known, or predetermined, to transmitter(s) and receiver(s) involved in the message communication identifying the particular symbol waveform alphabet to be used to generate symbol waveforms at particular times for sending the message. This sequence may be expressed in terms of the unique symbol waveform alphabet identifiers or otherwise and be a pseudo-random sequence or other sequence.
5. Convert the message into at least one bit string for communication.
6. Convert the bit string(s) in subsequences of bits. For example, the length of subsequence may be set to the log base two of the number of symbol waveforms in each symbol waveform alphabet in the set of symbol waveform alphabets. Each such bit string subsequence may be transmitted in one symbol time.
7. Retrieve, at the start of each symbol time, by the transmitter(s) and receiver(s), the symbol waveform alphabet according to the predetermined symbol waveform alphabet sequence provided to the transmitter(s) and receiver(s). In an exemplary implementation, the symbol waveform alphabets may be stored in lookup tables or other formats in hardware, e.g., computer readable medium, memory, or other storage, either in or proximate the transmitters and receivers. Each symbol waveform may be represented by samples taken by evaluating the symbol waveform over the symbol time duration.
8. Select, at the start of each symbol time, the symbol waveform within the selected symbol waveform alphabet that corresponds to a bit substring.
9. Transmit, by the transmitter, the waveform corresponding to the selected symbol waveform. The symbol waveforms to be transmitted may also be time sampled to produce a time-amplitude sequence prior to transmission.
10. Receive, by the receiver, the transmitted waveform. In an exemplary embodiment, the receiver may use minimum distance signal detection.
11. Convert the received waveform into the bit substring based on the symbol waveform alphabet according the alphabet sequence.

12. Reassemble the message from the received and converted bit substrings.

One of ordinary skill will appreciate that #1-3 of the above procedure may be performed at most times in advance of the actual data transmission in the system 10 and #4 may be performed up to the time of data transmission. For example, the symbol waveform alphabets may be generated and/or selected by any skilled practitioners associated with any entity involved in the data transmission including the data owner and/or transmission system/network operator, information technology administrator, etc. using one or more of the various techniques described in the reference cited and incorporated herein.

In various embodiments, the predetermined symbol waveform alphabet sequence may or may not be transmitted between the transmitter 12 and receiver 14 and/or from the management system 25. For example, the predetermined symbol waveform alphabet sequence may be generated via processor in or near the transmitter 12 and/or receiver 14 based on an initiator code provided by the transmitter 12, receiver 14, or management system 25 that results in the predetermined symbol waveform alphabet sequence being locally generated and known to each device. The local generation of the predetermined symbol waveform alphabet sequence may increase the security of data passing through the system 10.

In operation, SWH may be applied to new or existing modulation formats. For example, the aforementioned method was applied to generate symbol waveforms for use in combination with, or in lieu of, 8 state phase shift keying (8PSK) format. For purposes of demonstration and comparison, a polynomial symbol waveform (symbol waveform) alphabet was generated that is representative of a standard 8PSK format with Root Raised Cosine (RRC) filtering by starting with 8 sinusoidal polynomials having even phase offsets between them, then convolving with a polynomial corresponding to an RRC with $\alpha=0.1$, referred to herein as Poly_8PSK.

Figure 3:
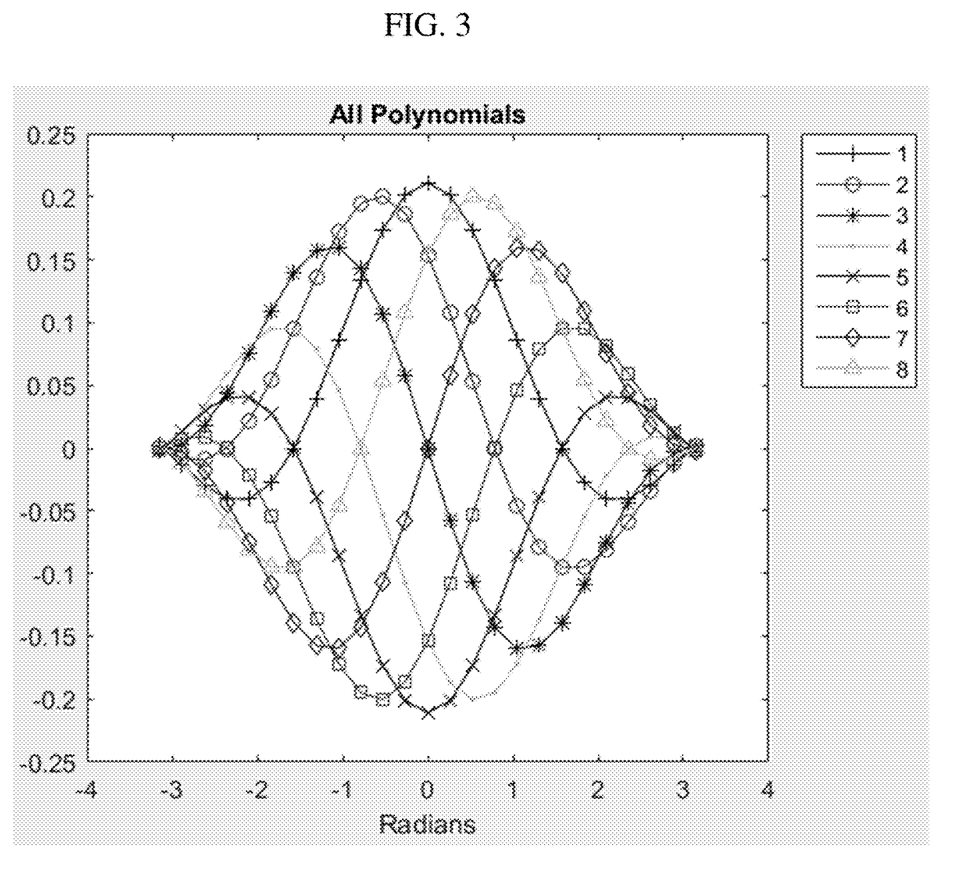
FIG. 3 illustrates an exemplary polynomial symbol waveform alphabet corresponding to the symbol waveforms used by standard 8-PSK with Root Raised Cosine (RRC) filtering, referred to herein as Poly_8PSK.

FIG. 3 illustrates the resulting polynomial symbol waveform alphabet corresponding to Poly_8PSK. As can be seen, the waveforms are symmetric about the x-axis and offset in phase. Transmission of a signal employing Poly8PSK was simulated using MATLAB. The occupied bandwidth (OBW) of the signal was determined using the MATLAB obw function based on a Fourier analysis of the signal to be 2.3 MHz.

For comparison, the OBW of the Poly_8PSK was also calculated using a software spectrum analyzer (SSA), such as described in U.S. Provisional Patent Application No. 62/848,280 filed May 15, 2019 entitled Devices, Systems, and Software including Signal Power Measuring and Methods and Software for Measuring Signal Power, which is incorporated by reference in its entirety, except for the claims and any disclosure contrary to this disclosure. The SSA, unlike Fourier analysis, does not require the signal to have a stationary spectrum, which enables the SSA to be applied to a wider range of modulation formats, e.g., polynomial symbol waveform with non-stationary spectrums and constant amplitude sinusoid with stationary spectrum alphabets.

The OBW calculated using the SSA was also found to be 2.3 MHz. The agreement between the Fourier-based OBW calculation and the SSA was expected because the Poly_8PSK is a stationary spectrum format just like 8PSK and the other constant amplitude sinusoidal-based modulation formats.

Figure 4:
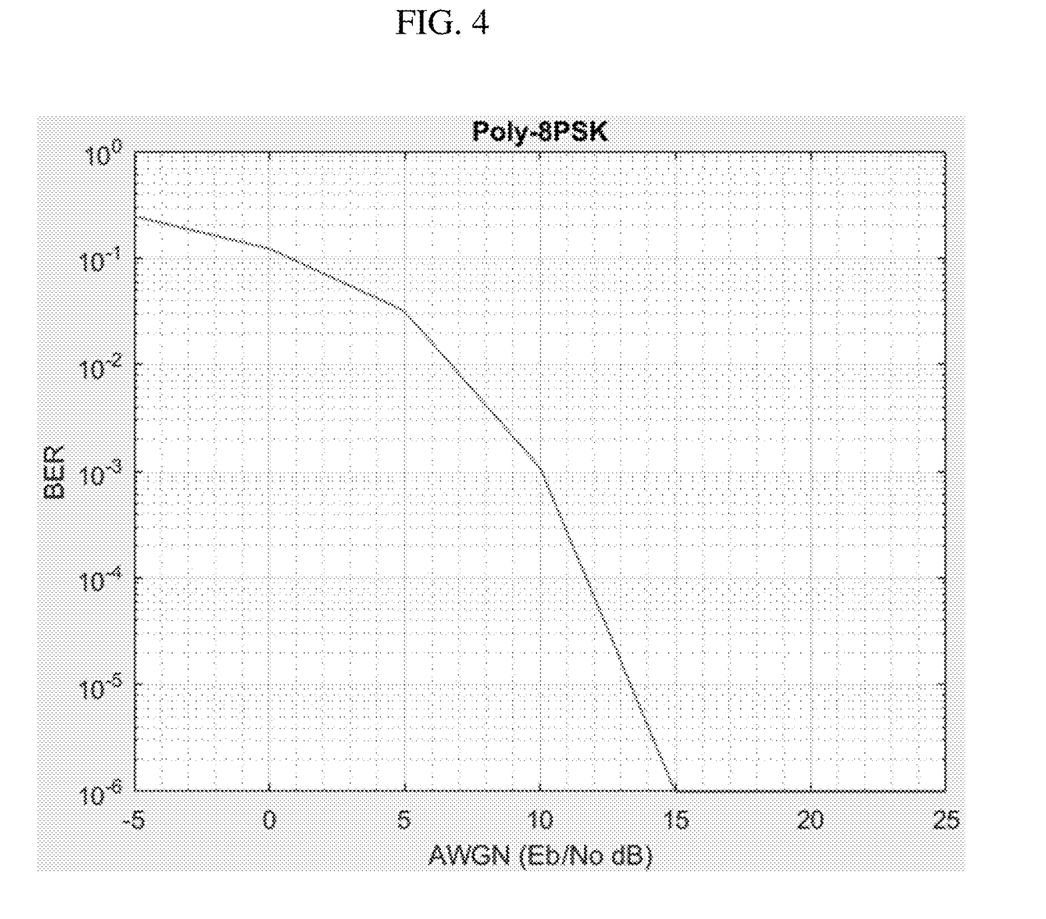
FIG. 4 is an exemplary BER v AWGN plot for the Poly_8PSK alphabet.

FIG. 4 shows exemplary results for bit error rate (BER) versus additive white Gaussian noise (AWGN) calculations for the Poly_8PSK. As can be seen, the BER vs. AWGN performance agrees well with the theoretical BER v AWGN performance for 8PSK.

Given the Poly_8PSK modulation format as a baseline, the present invention was applied to develop additional symbol waveforms that may be appropriately used to perform the SWH method. A first modulation format was developed using the techniques described in U.S. Patent Application No. U.S. Provisional patent application Ser. No. 16/735,655, incorporated above and optimized using a Monte Carlo method to have an OBW similar to Poly_8PSK, while retaining from prior design BER vs. AWGN performance (signal power efficiency) greater than Poly_8PSK.

Figure 5:
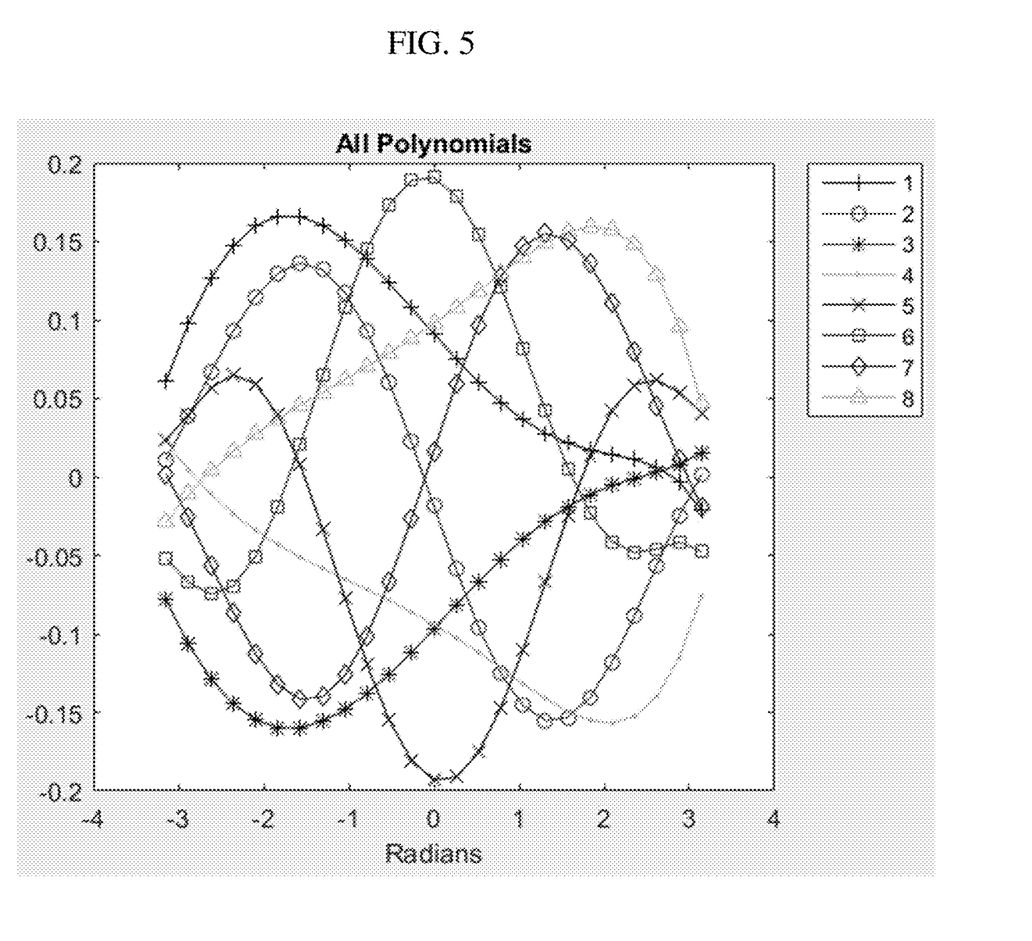
FIG. 5 illustrates an exemplary first polynomial symbol waveform alphabet, referred to herein as MC_OBW_Opt_A.

FIG. 5 shows the polynomial symbol waveform alphabet generated as the first modulation format, referred to herein as MC_OBW_Opt_A. As can be seen in the figure, while somewhat resembling the Poly_8PSK alphabet (FIG. 3), the MC_OBW_Opt_A alphabet has a different structure in that it includes symbol waveforms with forms, or shapes, that are significantly different than the symbol waveforms in the Poly_8PSK alphabet. In addition, some of waveforms are non-sinusoidal with a non-stationary spectrum. As such, the SSA was used to calculate the OBW and various calculations were performed using Monte Carlo techniques to optimize the alphabet for use with SWH.

The calculations were performed according to the following process:
The simulated symbol time was 1 microsecond in all calculations.
All alphabets were of size 8, corresponding to 3 bits per symbol.
Each polynomial symbol waveform was sampled 25 times in every symbol time.
OBW was measured in terms of 99% single-sided power occupancy, on streams of 15,000 simulated bits transmitted.
In all polynomial symbol waveform alphabets studied, all polynomials were individually power normalized to the same value of 0.1, in arbitrary units.
Signal power efficiency was measured in terms of BER vs. AWGN over a simulated signal length of 1.5 million bits transmitted per AWGN level.
For purposes of logarithmic plotting, a bit error rate (BER) of zero was mapped to 10e-6.
All polynomial symbol waveform alphabets were Gray coded to maximize BER performance in the presence of symbol detection errors induced by AWGN.

Figure 6:
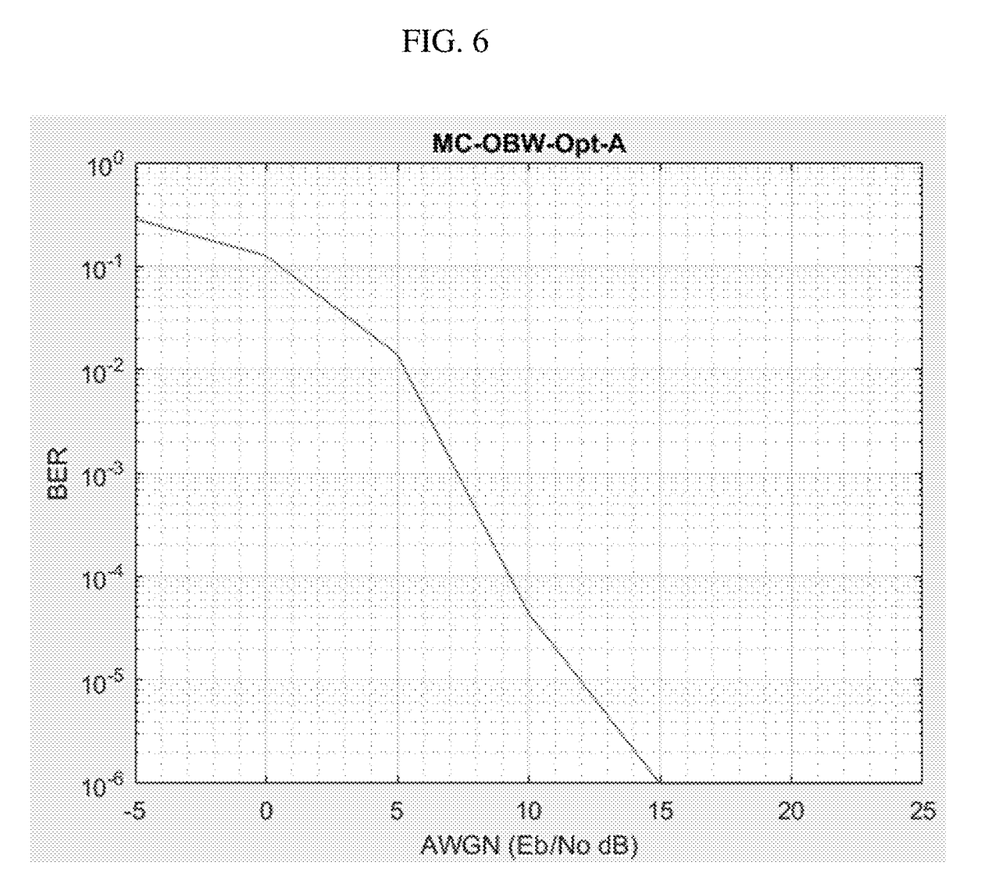
FIG. 6 is an exemplary BER v AWGN plot for the MC_OBW_Opt_A alphabet.

FIG. 6 shows the BER v AWGN results for the MC_OBW_Opt_A symbol waveform alphabet. As can be seen, the performance is approximately 2-3 dB better than Poly_8PSK. In addition, the OBW performance of MC_OBW_Opt_A is 2.3 MHz, which is substantially the same as Poly_8PSK.

Figure 7:
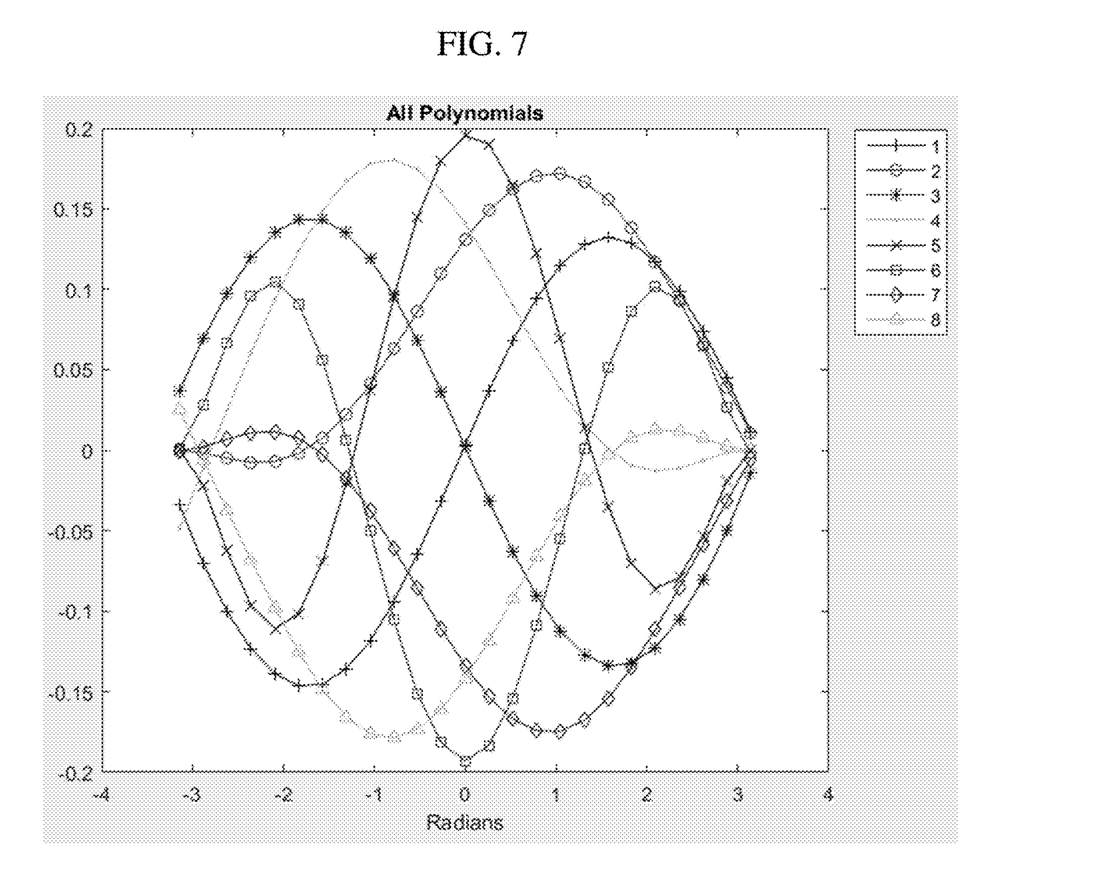
FIG. 7 illustrates an exemplary polynomial symbol waveform alphabet, referred to herein as MC_OBW_Opt_B.

FIG. 7 shows a second modulation format, referred to herein as MC_OBW_Opt_B, that was generated for use in SWH methods of the present invention. The second modulation format was generated starting from the Poly_8PSK and then optimizing the design of the alphabet for BER v AWGN performance, while maintaining the OBW of the Poly_8PSK alphabet. As can be seen in FIG. 7, the MC_OBW_Opt_B alphabet, while resembling the Poly_8PSK alphabet (FIG. 3), has a different structure in that it includes symbol waveforms with forms that are significantly different than the symbol waveforms in the Poly_8PSK alphabet and also has some non-sinusoidal waveforms.

Figure 8:
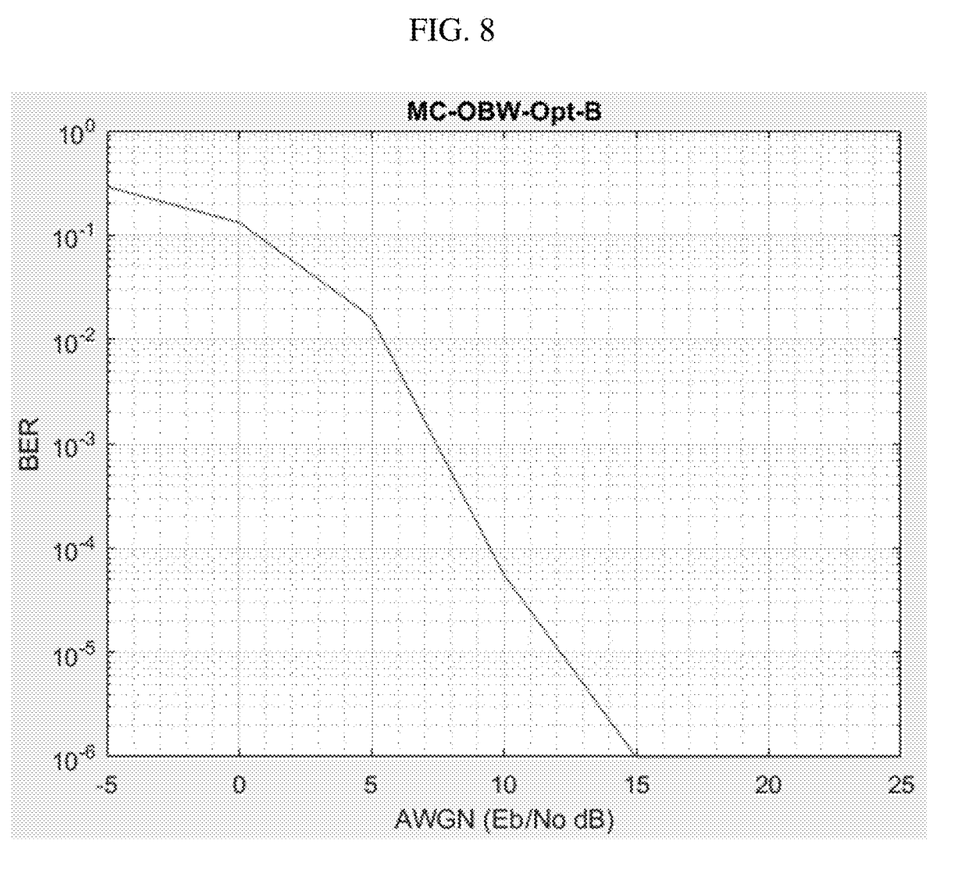
FIG. 8 is an exemplary BER v AWGN plot for the MC_OBW_Opt_B alphabet.

FIG. 8 shows the BER v AWGN results for the MC_OBW_Opt_B. As can be seen, the performance is also approximately 2-3 dB better than Poly_8PSK. The OBW performance of MC_OBW_Opt_B remains 2.3 MHz, which is consistent with OBW for Poly_8PSK.

The similar transmission/communication performance of the MC_OBW_Opt_A and MC_OBW_Opt_B alphabets, while having different waveforms, suggests that various combinations of the two alphabets may be useful for implementing SWH technology in various systems. It will be appreciated that for applications in which Poly_8PSK may provide acceptable communication performance, SWH may be implemented using Poly_8PSK along with MC_OBW_Opt_A and MC_OBW_Opt_B based on the different symbol waveforms in each alphabet. For example, systems that currently employ 8PSK modulation formats may be candidates for SWH technology employing these alphabets.

One of ordinary skill will further appreciate that other alphabets with similar transmission performance characteristics may be used in combination with, or in lieu of, one, some, or all of these alphabets. It will be further appreciated that 8-symbol alphabets have been used herein for exemplary purposes. SWH may be based on other alphabet sizes, e.g., 4, 16, or 64, 128, 512 symbol waveforms, and other modulation formats. In some applications, it may be desirable to employ various combinations of stationary and/or nonstationary waveforms in SWH embodiments, depending upon channel conditions, data throughput requirements, or other considerations.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:
1. A method of data transmission, comprising:
providing, via at least one of a processor and a user, to a transmitter and a receiver in communication to transmit data via one data stream,
a predetermined symbol waveform alphabet sequence including
a plurality of symbol waveform alphabets,
each symbol waveform alphabet including a plurality of symbol waveforms,
where data transmitted in at least one symbol waveform alphabet can not be received by the receiver using the other symbol waveform alphabets, and
each alphabet having sufficient transmission performance to be used to transmit the data from the transmitter to the receiver;
converting the data into a sequence of symbol waveforms selected from the plurality of symbol waveform alphabets including the at least one symbol waveform alphabet that can not be received by the receiver using the other symbol waveform alphabets according to the predetermined symbol waveform alphabet sequence;
transmitting, by the transmitter, the sequence of symbol waveforms;
receiving, by the receiver, the transmitted sequence of symbol waveforms; and,
converting the received sequence of symbol waveforms into the data based on the predetermined symbol waveform alphabet sequence.

2. The method of claim 1, where
the plurality of symbol waveform alphabets are selected to have similar transmission performance.

3. The method of claim 1, where
the plurality of symbol waveform alphabets are selected to have similar occupied bandwidth (OBW) and bit error rate (BER) versus additive white Gaussian noise (AWGN) performance.

4. The method of claim 1, where
the plurality of symbol waveform alphabets are selected to have a number of symbol waveforms equal to a power of two.

5. The method of claim 1, where
the plurality of symbol waveform alphabets are selected to have the same number of symbol waveforms.

6. The method of claim 1, further comprising:
constructing a time-amplitude sequence corresponding to the data by sampling the sequence of symbol waveforms, where the time-amplitude sequence is transmitted and received.

7. The method of claim 1, where
each symbol waveform is transmitted in one symbol time.

8. The method of claim 1, where
the plurality of symbol waveform alphabets is provided as at least one lookup table.

9. The method of claim 1, where
converting the received waveform includes looking up the received waveform in a lookup table for the symbol waveform alphabet.

10. The method of claim 1, where
no two symbol waveform alphabets include all of the same symbol waveforms.

11. The method of claim 1, where providing the plurality of symbol waveform alphabets comprises:
identifying a set of symbol waveform alphabets to transmit data having similar overall signal transmission performance, with no two alphabets including all of the same symbol waveforms;
assigning a unique identifier to each symbol waveform alphabet; and
associating a unique bit string to each symbol waveform in each alphabet.

12. The method of claim 1, where transmitting the sequence of symbol waveforms comprises:
converting the data into a sequence of bit strings for transmission;
converting the bit strings into bit string subsequences;
accessing the symbol waveform alphabets according to the predetermined symbol waveform alphabet sequence; and
selecting the symbol waveforms within the accessed symbol waveform alphabet that corresponds to the bit string subsequences to provide the sequence of symbol waveforms for transmission.

13. The method of claim 1, where the predetermined symbol waveform alphabet sequence is provided by at least one of the transmitter providing the predetermined symbol waveform alphabet sequence to the receiver and the receiver providing the predetermined symbol waveform alphabet sequence to the transmitter.

14. The method of claim 1, where a management system provides the predetermined symbol waveform alphabet sequence to the receiver.

15. The method of claim 1, where the predetermined symbol waveform alphabet sequence is randomly generated.

16. The method of claim 1, where the symbol waveforms in at least two symbol waveform alphabets are sufficiently distinct that the receiver configured to detect one of the symbol waveform alphabets cannot reliably receive the data transmitted in the other symbol waveform alphabets.

17. The method of claim 1, where the symbol waveforms in at least two symbol waveform alphabets are sufficiently distinct that the receiver configured to detect a third symbol waveform alphabet cannot reliably detect the data transmitted using two other symbol waveform alphabets.

18. The method of claim 1, where the symbol waveforms are selected from the plurality of symbol waveform alphabets by switching between the symbol waveform alphabets used to convert the data based on the predetermined symbol waveform alphabet sequence.

19. A system comprising:
a transmitter to
 receive a message, and
 transmit the message as a sequence of symbol waveforms via one transmission channel,
  the symbol waveforms selected from a plurality of symbol waveform alphabets according to a predetermined waveform alphabet sequence, where
  the message transmitted in at least one symbol waveform alphabet that can not be received by a receiver using the other symbol waveform alphabets, and
 each alphabet having sufficient transmission performance to transmit the message from the transmitter to the receiver; and
the receiver to
 receive the sequence of symbol waveforms, and
 convert the received symbol waveforms into the message based on the predetermined sequence waveform alphabet sequence and the plurality of symbol waveform alphabets, and
 output the message.

20. A non-transitory computer readable medium storing instructions, the instructions comprising:
one or more instructions which, when executed by one or more processors, cause the one or more processors to:
 convert a message into a sequence of symbol waveforms in one data stream, the symbol waveforms selected from a plurality of symbol waveform alphabets according to a predetermined sequence of the plurality of symbol waveform alphabets, where the message transmitted in at least one symbol waveform alphabet can not be received by a receiver using the other symbol waveform alphabets, and each alphabet having sufficient transmission performance to transmit the message from a transmitter to the receiver; and
 transmit, by the transmitter, the sequence of symbol waveforms.

21. The non-transitory computer readable medium of claim 20, where converting the message occurs in the transmitter.

22. The non-transitory computer readable medium of claim 20, where
the one or more instructions further cause the one or more processors to:
 receive, by the receiver, the sequence of symbol waveforms, and
 convert the received symbol waveforms into the message based on the predetermined sequence of the plurality of symbol waveform alphabets.

* * * * *